United States Patent [19]
Pace

[11] 4,056,859
[45] Nov. 8, 1977

[54] WIRE STRINGING DEVICE

[75] Inventor: Joseph L. Pace, Brooklyn, N.Y.

[73] Assignee: Lawrence Peska Assoc., New York, N.Y.

[21] Appl. No.: 655,968

[22] Filed: Feb. 6, 1976

[51] Int. Cl.² .......................... E21C 29/16; F41B 7/00; B21F 1/00
[52] U.S. Cl. .................................. 7/14.1 R; 124/27; 43/19; 254/134.3 FT
[58] Field of Search ................ 7/14.1 R, 1 H; 124/27; 254/134.3 FT; 43/6, 19; 30/125, 127

[56] References Cited

U.S. PATENT DOCUMENTS

| | | | |
|---|---|---|---|
| 305,873 | 9/1884 | Williams | 124/27 |
| 2,544,784 | 3/1951 | Frum | 7/14.1 R |
| 2,930,584 | 3/1960 | Hensley | 43/19 |
| 2,966,337 | 12/1960 | Knapp | 254/134.3 FT |
| 3,059,630 | 10/1962 | Oreskey | 124/27 |
| 3,382,859 | 5/1968 | Myers | 254/134.3 FT |

FOREIGN PATENT DOCUMENTS 1,430,257 1/1966 France ....................................... 43/19

*Primary Examiner*—Al Lawrence Smith
*Assistant Examiner*—Roscoe V. Parker

[57] ABSTRACT

A spring gun with a dispensing device and a cutter-stripper device, enables electricians to string wires through large unobstructed access, such as the space above suspended ceilings. The gun projects a dart, which carried the end of a drag line or fine wire to the desired location. If a drag line is used the cutter-stripper device is operated to cut the line so that a wire can be affixed thereto, to be pulled through the space. If a fine wire is shot through the space after the wire is in place, the cutter-stripper device is operated to prepare the wire end for its final installation.

3 Claims, 3 Drawing Figures

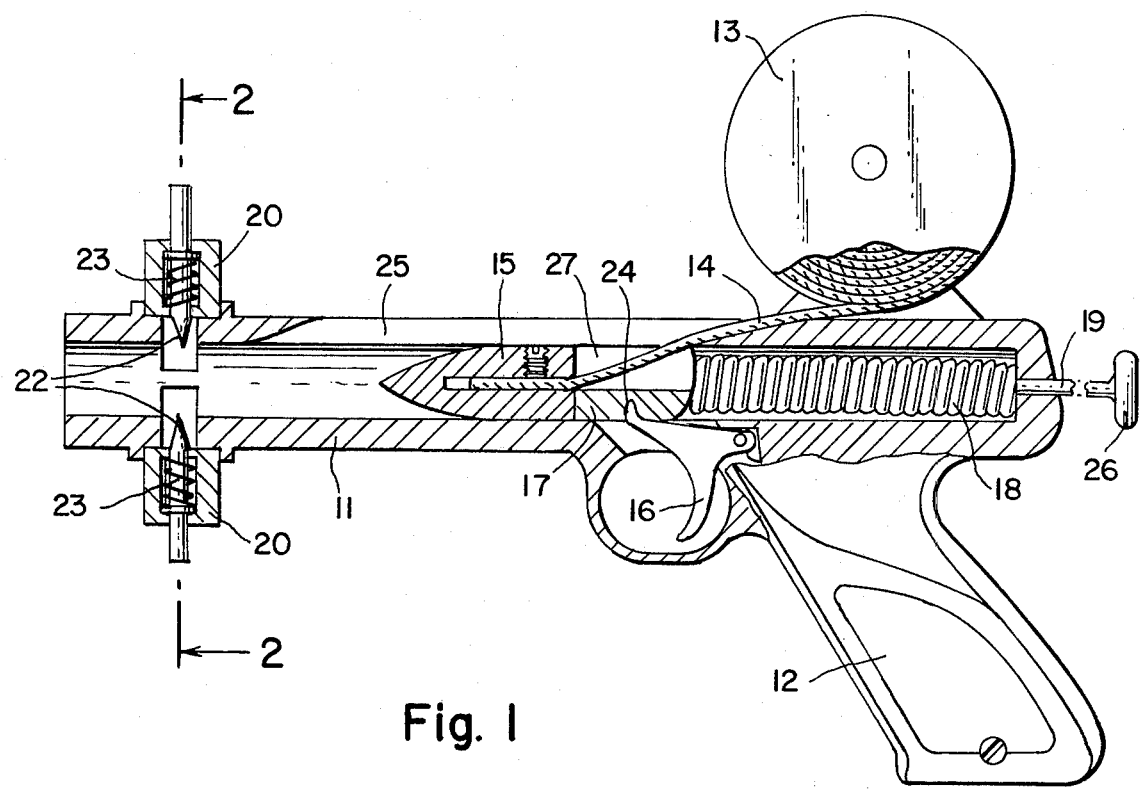
Fig. 1
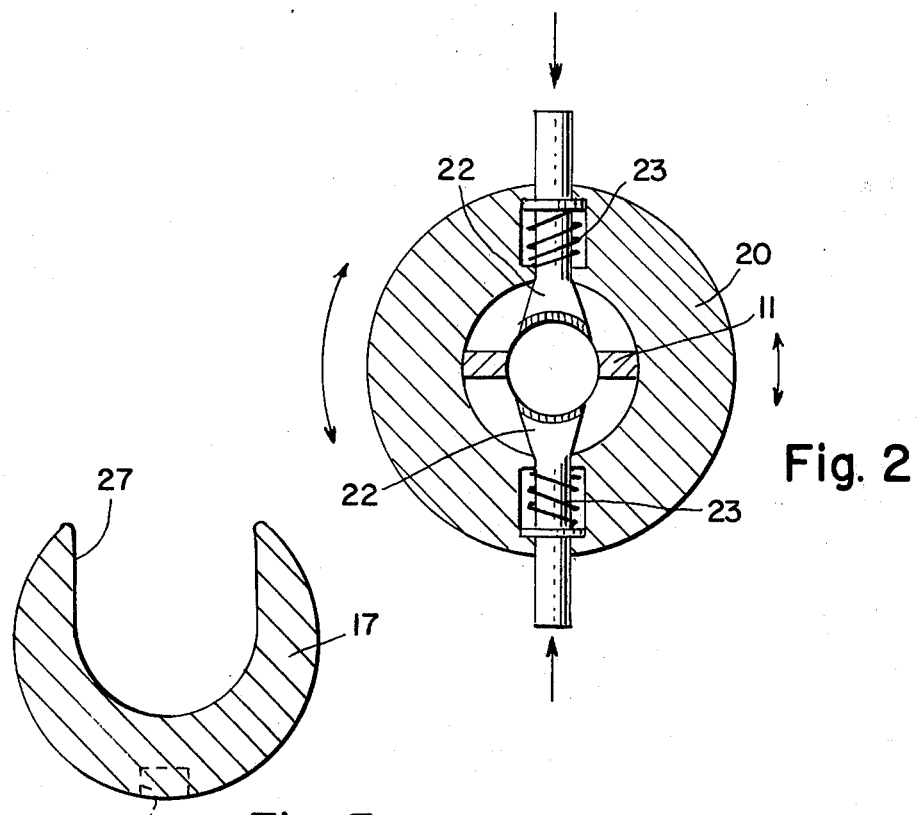
Fig. 2
Fig. 3

WIRE STRINGING DEVICE

BACKGROUND OF THE INVENTION

The invention is in the field of ancillary electrical wiring devices. The most widely used device for stringing wires through inaccessible areas is the electrician's snake, a long flat blade of spring steel. However, this device is of limited use in spanning long distances which, while are unobstructed to view, have an obstructed lower surface which tends to catch the end of the snake. Various spring gun devices are known for other purposes, such as fishing (see for example, U.S. Pat. No. 3,059,630 issued Oct. 23, 1962). However, a device particularly adapted to meet the needs of the electrician is desired.

SUMMARY OF THE INVENTION

The electrician's wire stringing device of the invention is a spring gun with a dispenser at the rear end of the barrel and a stripper-cutter device at the nozzle end. The gun projects a dart which carries the end of drag line or fine wire to its destination, for example, over a large open span or through the space above a suspended ceiling. These are commonly met situations, in which it is difficult to string wires by other means. If a drag line is used, the cutter-stripper device is operated to cut the line so that a wire can be affixed thereto, to be pulled through the space. If a fine wire is shot through the space after the wire is in place, the cutter-stripper device is operated to prepare the wire end for its final installation and sever it from the wire remaining in the dispenser.

BRIEF DESCRIPTION OF THE DRAWINGS

FIG. 1 is an elevational view, partly in section, of an exemplary device of the invention;

FIG. 2 is a cross sectional view of an exemplary stripper-cutter device; and

FIG. 3 is a cross sectional view of an exemplary slotted piston.

DETAILED DESCRIPTION OF THE INVENTION

FIG. 1 shows an exemplary wire stringing device of the invention. It includes a barrel 11 supported by a handle 12 at its base end. The barrel 11 carries a dispenser 13, such as the illustrated reel. Although, other dispensers, such as a center feeding spool can be used. The bore of the barrel 11 contains a slotted piston 17 which guides the drag line or wire 14 to the dart 15. The dart 15 is adapted for accepting and fixing the end of the line 14. The line 14 is fed from the dispenser 13 through a slot 25 in the barrel 11, through the slotted piston 17 to the dart 15. The piston 17 compresses a spring 18, when a compression means is operated. The illustrated compression means is a rod 19 affixed to the piston 17. The rod 19 extends through the spring 18 and the rear base end of the barrel 11 and terminates in a knob or handle 26.

The piston 17 is held in the cocked (compressed) position by a trigger 16, which, for example, engages a notch 24 in the piston 17. The trigger 16 operates by finger pressure to release the piston and allows the spring 18 to expand through the forward extending portion of the barrel, toward the muzzle end of the barrel and project the dart 15 from the barrel 11 and carry the line 14 to its destination. As the dart 15 moves forward, the line 14 is fed into the barrel slot 25 and is guided by the slotted piston 17.

When the line 14 is in place, the stripper-cutter is operated by depressing the cutter blades 22 into the bore of the barrel 11, severing the drag line 14 so that it can be fixed to the end of a wire. The drag line is then pulled from the other end, drawing the wire through the space. When a fine wire is projected by the device, the stripper-cutter is operated by depressing the cutter blades 22 into the bore of the barrel 11 and rotating the housing 20 in which the blades 22 are held by action of springs 23. This cuts through the insulation of the wire 14. The wire is then manually advanced and the blades 22 compressed further to server the wire 14 from that remaining in in the dispenser 13.

FIG. 2 is a sectional view, through the stripper-cutter housing 20, showing in more detail, the blades 22 and springs 23. The blades 22 extend circumferentially such that the limited rotation of the blades 22 can produce cutting of nearly the entire circumference of the wire 14 insulation.

FIG. 3 is a sectional view of the slotted piston 17, showing the wire guiding slot 27 and the trigger detent notch 24.

I claim:

1. An electricians wire stringing assistance device comprising:
   a. A barrel carried upon a laterally outstanding gripping handle, said barrel having a cylindrical bore therein, which is closed at the rearward base end and open at the forward muzzle end and with a forward extending portion, extending forwardly of the handle, a longitudinal slot in the forward extending portion of the barrel opposite of the handle, terminating in an abutment adjacent to the muzzle end thereof;
   b. means for dispensing flexible line, said means being mounted on the barrel adjacent to the base end of the slot and adapted for feeding the line into the slot;
   c. a spring within the bore abutting against the base end of the barrel and being adapted to drive forwardly toward the muzzle end of the barrel when released from a compressed position in the rear portion thereof;
   d. a slotted piston carried within the bore against the forward end of the spring including compression means for drawing the piston rearward in order to compress the spring, the slot of said piston being adjacent to the slot of said barrel and adapted for guiding the line as the wire is fed into the slot of the barrel;
   e. a trigger mounted to the handle and adapted for engaging the piston and holding the spring in a compressed position and for releasing the piston in response to finger pressure, thereby permitting a dart, set within the barrel and affixed to the line, to be projected from the device carrying the line to its destination; and
   f. a cutter means situated on the barrel between the muzzle end of the barrel and the muzzle end of the barrel slot, adapted for stripping and cutting the line after the dart has been projected and the line carried to its destination which cutter means includes a rotatable housing with spring loaded blades adapted for insertion into the bore, whereby the line can be stripped and cut upon rotation of the housing.

2. A device of claim 1 in which the piston compression means includes a rod affixed to the rearward end of the piston and extending through the base end of the barrel and terminating in a grasping handle.

3. A device of claim 1 in which the means for dispensing the flexible line, is a reel.

* * * * *